(12) United States Patent
Österling (10) Patent No.: US 9,614,559 B2
(45) Date of Patent: Apr. 4, 2017

(54) EVALUATION OF INTERFERENCE AFFECTING A CABLE

(71) Applicant: TELEFONAKTIEBOLAGET LM ERICSSON (PUBL), Stockholm (SE)

(72) Inventor: Jacob Österling, Järfälla (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 15/106,046

(22) PCT Filed: Dec. 19, 2013

(86) PCT No.: PCT/SE2013/051571
§ 371 (c)(1),
(2) Date: Jun. 17, 2016

(87) PCT Pub. No.: WO2015/094050
PCT Pub. Date: Jun. 25, 2015

(65) Prior Publication Data
US 2017/0033814 A1   Feb. 2, 2017

(51) Int. Cl.
| | | |
|---|---|---|
| *H04B 15/00* | (2006.01) | |
| *H04B 1/10* | (2006.01) | |
| *H04W 4/04* | (2009.01) | |
| *H04W 4/00* | (2009.01) | |
| *H04B 3/46* | (2015.01) | |

(52) U.S. Cl.
CPC ............ *H04B 1/1027* (2013.01); *H04B 3/46* (2013.01); *H04W 4/005* (2013.01); *H04W 4/043* (2013.01)

(58) Field of Classification Search
USPC ... 455/550.1, 501, 67.11, 67.13, 63.1, 556.1, 455/561
See application file for complete search history.

(56) References Cited

U.S. PATENT DOCUMENTS

| | | | | |
|---|---|---|---|---|
| 2004/0032853 | A1* | 2/2004 | D'Amico | H04L 1/1893 370/349 |
| 2009/0135754 | A1* | 5/2009 | Yavuz | H04W 74/04 370/311 |
| 2011/0026423 | A1* | 2/2011 | Quigley | H04L 1/203 370/252 |

* cited by examiner

*Primary Examiner* — Fayyaz Alam (57) ABSTRACT

A method for evaluating interference affecting a cable between a network node and at least one remote radio head. The method is performed in the network node and comprises the steps of determining a set of wireless devices to be associated with the cable; obtaining a plurality of signal quality estimates associated with each one of the wireless devices of the set of wireless devices; averaging the signal quality estimates for the set of wireless devices, yielding an average signal quality; and determining interference affecting the cable based on a spectral analysis of the average signal quality.

19 Claims, 6 Drawing Sheets

EVALUATION OF INTERFERENCE AFFECTING A CABLE

This application is a 371 of International Application No. PCT/SE2013/051571, filed Dec. 19, 2013, the disclosure of which is fully incorporated herein by reference.

TECHNICAL FIELD

The invention relates to a method, network node, computer program and computer program product for evaluating interference affecting a cable between a network node and at least one remote radio head.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient capacity with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use remote radio heads, where several remote radio heads connected to the same radio base station share the same cell. In this way, a single radio base station can provide coverage in different parts of the building by placing the remote radio heads appropriately. Moreover, the wireless device can move between the coverage of different remote radio heads while staying within the same cell, thus avoiding causing handovers.

The cable between the radio base station and the remote radio heads, however, is often susceptible to interference. There is currently no known way to detect such interference, and no way to take action to reduce any effects of such interference.

SUMMARY

It is an object to improve determination of interference on remote radio head cables.

According to a first aspect, it is presented a method for evaluating interference affecting a cable between a network node and at least one remote radio head. The method is performed in the network node and comprises the steps of: determining a set of wireless devices to be associated with the cable; obtaining a plurality of signal quality estimates associated with each one of the wireless devices of the set of wireless devices; averaging the signal quality estimates for the set of wireless devices, yielding an average signal quality; and determining interference affecting the cable based on a spectral analysis of the average signal quality. By averaging signal quality estimates of wireless terminals of a set associated with the cable and performing a spectral analysis of the resulting average signal quality, the interference on the IF cable can be detected. This will suppress transient issues and location specific issues of a particular wireless device, whereby the more persistent interference remains.

The step of averaging may also comprise averaging the signal quality estimates over a time period. This provides better suppression of transient interference.

The time period may depend on the number of wireless devices in the set of wireless devices. For example, when there are many wireless devices in the set, the time period can be shorter.

The step of obtaining a plurality of signal quality estimates may comprise measuring uplink reference signals from each one of the wireless devices of the set of wireless devices. By using uplink reference signals, the signal quality can be measured with arbitrary frequency accuracy, since there is no required division into frequency components of the received reference signal when comparing to what is expected to be received.

The step of obtaining a plurality of signal quality estimates may comprise receiving measurement reports from each one of the wireless devices of the set of wireless devices, wherein the measurements reports are based on how downlink reference signals are received at the respective wireless device. The downlink reference signals can e.g. be CRS (cell specific reference signals) signals. In this way, existing reports may be used for evaluation of downlink signal quality, e.g. based on CRS.

The step of obtaining a plurality of signal quality estimates may comprise obtaining a number of retransmissions for each one of the wireless devices of the set of wireless devices; and the step of determining interference may comprise determining for what frequency band or frequency bands retransmissions are most common.

The method may further comprise the step, prior to the step of determining, of: determining, for each one of a plurality of wireless devices, which one of the at least one remote radio head which is closest; and the step of determining a set of wireless devices to be associated with the cable may comprise determining the set of wireless devices to only include those wireless devices which are closest to one or more remote radio heads which are connected to the cable.

The method may further comprise the step of: determining one or more new frequency sections to use on the cable based on the interference affecting the cable, when the interference is greater than a threshold value.

The step of determining one or more new frequency sections to use may optionally only determine one or more new frequency sections to use when a threshold time has passed since the last determination of new frequency sections.

According to a second aspect, it is presented a network node for evaluating interference affecting a cable between a network node and at least one remote radio head. The network node comprises: a processor; and a memory storing instructions that, when executed by the processor, causes the network node to: determine a set of wireless devices to be associated with the cable; obtain a plurality of signal quality estimates associated with each one of the wireless devices of the set of wireless devices; average the signal quality estimates for the set of wireless devices, yielding an average signal quality; and determine interference affecting the cable based on a spectral analysis of the average signal quality.

The instructions to average may also comprise instructions that, when executed by the processor, causes the network node to average the signal quality estimates over a time period.

The time period may depend on the number of wireless devices in the set of wireless devices.

The instructions to obtain a plurality of signal quality estimates may comprise instructions that, when executed by the processor, causes the network node to measure uplink reference signals from each one of the wireless devices of the set of wireless devices.

The instructions to obtain a plurality of signal quality estimates may comprise instructions that, when executed by the processor, causes the network node to receive measurement reports from each one of the wireless devices of the set of wireless devices, wherein the measurements reports are based on how downlink reference signals are received at the respective wireless device.

The instructions to obtain a plurality of signal quality estimates may comprise instructions that, when executed by the processor, causes the network node to obtain a number of retransmissions for each one of the wireless devices of the set of wireless devices; and the instructions to determine interference may comprise instructions that, when executed by the processor, causes the network node to determine for what frequency band or frequency bands retransmissions are most common.

The network node may further comprise instructions that, when executed by the processor, causes the network node to: determine, for each one of a plurality of wireless devices, which one of the at least one remote radio head which is closest; and the instructions to determine a set of wireless devices to be associated with the cable may comprise instructions that, when executed by the processor, causes the network node to determine the set of wireless devices to only include those wireless devices which are closest to one or more remote radio heads which are connected to the cable.

The network node may further comprise instructions that, when executed by the processor, causes the network node to: determine one or more new frequency sections to use on the cable based on the interference affecting the cable, when the interference is greater than a threshold value.

The instructions to determine one or more new frequency sections to use may optionally only determine one or more new frequency sections to use when a threshold time has passed since the last determination of new frequency sections.

According to a third aspect, it is presented a computer program for evaluating interference affecting a cable between a network node and at least one remote radio head. The computer program comprises computer program code which, when run on the network node causes the network node to: determine a set of wireless devices to be associated with the cable; obtain a plurality of signal quality estimates associated with each one of the wireless devices of the set of wireless devices; average the signal quality estimates for the set of wireless devices, yielding an average signal quality; and determine interference affecting the cable based on a spectral analysis of the average signal quality.

According to a fourth aspect, it is presented a computer program product comprising a computer program according to claim 19 and a computer readable means on which the computer program is stored.

According to a fifth aspect, it is presented a network node comprising: means for determining a set of wireless devices to be associated with a cable between a network node and at least one remote radio head; obtaining a plurality of signal quality estimates associated with each one of the wireless devices of the set of wireless devices; averaging the signal quality estimates for the set of wireless devices, yielding an average signal quality; and determining interference affecting the cable based on a spectral analysis of the average signal quality.

The means for averaging may also comprise means for averaging the signal quality estimates over a time period.

The time period may depend on the number of wireless devices in the set of wireless devices.

The means for obtaining a plurality of signal quality estimates may comprise means for measuring uplink reference signals from each one of the wireless devices of the set of wireless devices.

The means for obtaining a plurality of signal quality estimates may comprise means for receiving measurement reports from each one of the wireless devices of the set of wireless devices, wherein the measurements reports are based on how downlink reference signals are received at the respective wireless device.

The means for obtaining a plurality of signal quality estimates may comprise means for obtaining a number of retransmissions for each one of the wireless devices of the set of wireless devices; and the means for determining interference may comprise means for determining for what frequency band or frequency bands retransmissions are most common.

The network node may further comprise means for determining, for each one of a plurality of wireless devices, which one of the at least one remote radio head which is closest; and the means for determining a set of wireless devices to be associated with the cable may comprise means for determining the set of wireless devices to only include those wireless devices which are closest to one or more remote radio heads which are connected to the cable.

The network node may further comprise means for determining one or more new frequency sections to use on the cable based on the interference affecting the cable, when the interference is greater than a threshold value.

The means for determining one or more new frequency sections to use may comprise means for only determining one or more new frequency sections to use when a threshold time has passed since the last determination of new frequency sections.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
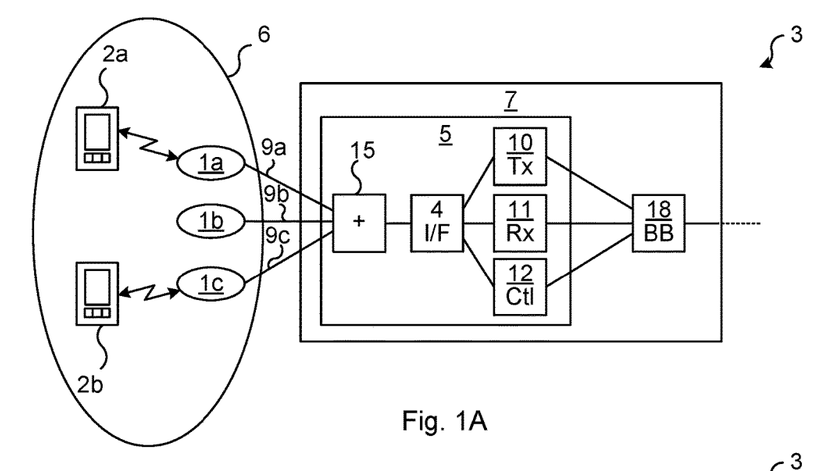
FIGS. 1A-C are schematic diagrams illustrating environments where embodiments presented herein can be applied.
Figure 1B:
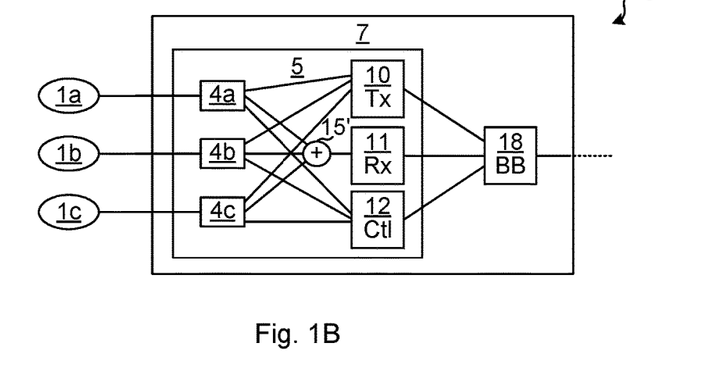
Figure 1C:
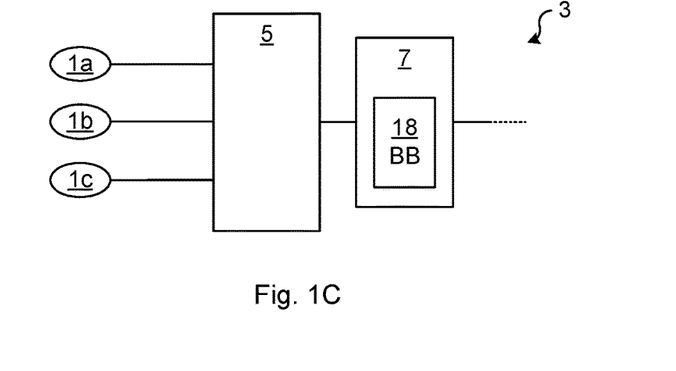

FIGS. 1A-C are schematic diagrams illustrating a wireless communication networks 3 being environments where embodiments presented herein can be applied. Considering first FIG. 1A, the wireless communication network 3 comprises a number of remote radio heads 1a-c for installation in locations where traditional deployment with antennas being co-located with the radio base stations is not ideal. For example, the wireless communication network 3 can be installed indoors, such as in an office, shopping centre, train station or airport.

It is to be noted that, while the embodiments presented herein are described as implemented using LTE (Long Term Evolution), any applicable communication standard may be used, such as any one or a combination of LTE-SAE (Long Term Evolution—System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

A radio base station 7 here comprises a baseband module 18 and an intermediate radio unit (IRU) 5. The IRU 5 is in turn connected to a number (in this example three) remote radio heads 1a-c via respective cables 9a-c. The remote radio heads 1a-c connected to the IRU 5 are part of a single cell 6 and thus share a cell identifier. Antennas do not need to be included in this embodiment of the radio base station 7 or the IRU 5, as the remote radio heads 1a-c provide the wireless link to one or more wireless devices 2a-b. The wireless link provided by the remote radio heads 1a-c includes both downlink communication to the wireless devices 2a-b and uplink communication from the wireless devices 2a-b. The term wireless device is also known as mobile communication terminal, user equipment (UE), station (STA), mobile terminal, user terminal, user agent, machine-to-machine devices etc., and can be, for example, what today are commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is introduced, denoted the Intermediate Frequency (IF), which is used for communication on the cables 9a-c between the IRU 5 and the remote radio heads 1a-c.

For uplink communication, the remote radio heads 1a-c downconvert a received (uplink) signal to IF and send it over its cable 9a-c to the IRU 5. In this embodiment, the received IF signals are combined in a combiner 15 and fed to an interface circuitry 4. The interface circuitry 4 extracts the received IF signal from the interface and forwards it to the RX (reception) back-end 11. The RX back-end 11 downconverts the received signals from IF to an analogue BB (baseband) signal which is further filtered and digitized. The RX back-end 11 sends the combined received signals in digital form to the baseband module 18 for further processing such as demodulation, decoding, etc. as known in the art per se.

Optionally, the remote radio heads 1a-c are also powered over the respective cables 9a-c.

For downlink communication, the process works in reverse to the uplink. Hence, the baseband module 18 sends a digital BB signal for transmission to a TX (transmission) back-end 10 of the IRU 5. The TX back-end 10 pulse shapes the digital BB signal to an analogue transmission signal and upconverts the transmission signal to IF. The transmission signal in IF is then inserted onto the interface by the interface circuitry 4, and provided to the combiner 15 which also functions as a splitter, providing the same transmission signal in IF to all connected remote radio heads 1a-c over the respective cables 9a-c. The remote radio heads 1a-c then upconverts the IF signal to RF and transmits the RF signal over the air to the wireless devices 2a-b.

It is to be noted that the processing of signals in the IRU and the remote radio heads 1a-c do not need to occur in the digital domain and can be (but do not need to be) performed completely in the analogue domain.

The remote radio heads 1a-c converts from IF to RF for downlink transmission and from RF to IF for uplink reception. Conversely, the IRU converts from digital BB to IF for downlink transmission and from IF to digital BB for uplink reception.

By using IF over the cables 9a-c instead of RF, cheaper, low quality cables can be used, such s CAT5, CAT5e or CAT6 cables. In this way, existing indoor cabling can many times be reused during installation, which significantly saves cost and installation time.

Moreover, there is an optional control link between a processor 12 in the IRU 5 and each remote radio head 1a-c. This control link can be used e.g. to set the RF frequency used for downconversion and upconversion in the remote radio heads 1a-c.

The transmission and reception is under the control of the MAC (Media Access Control) scheduler in the baseband module 18. The MAC scheduler informs what transmissions should be made and informs, via the downlink signaling, the wireless devices when to transmit and on which frequency and power.

It is to be noted that, although FIG. 1A shows the baseband module 18 connected to one IRU 5, each baseband module 18 can be connected to several IRUs. Each IRU may have its own cell or several IRUs may share a single cell.

It is to be noted that while the embodiment of FIG. 1A shows three remote radio heads 1a-c, there may be fewer or more remote radio heads connected to each IRU 5.

The embodiment shown in FIG. 1B is similar to the embodiment of FIG. 1A, and only differences to the embodiment of FIG. 1A will be described. In this embodiment, there are several interface circuitry 4a-c, one for each remote radio head. Transmission signals are sent in IF from the transmission back-end 10 to each one of the interface circuitry 4a-c, either directly or via a splitter (not shown). Analogously, control signals are sent between the processor 12 and each one of the interface circuitry 4a-c, either directly or via a splitter (not shown). Received signals are sent in IF from the respective interface circuitry 4a-c to a combiner 15' which may here be a pure combiner without splitting functionality.

In this embodiment, the control link between the IRU and the remote radio-heads 1a-c can be point-to-point, which prevents collision of control messages to different remote radio heads 1a-c. Also, some measurements can be done on each individual link, in the IRU 5, e.g. power measurements.

Furthermore, in this embodiment, different intermediate frequencies may be used on the different interfaces to best adapt to each interface interference and transmission characteristics. Thus, the TX back-end 10 may send the transmission signal using different IF frequencies to the different instances of interface circuitry 4a-c, and the RX back-end 11 downconverts from different IF frequencies for the different instances of interface circuitry 4a-c.

FIG. 1C is a schematic diagram illustrating an alternative embodiment in terms of IRU and radio base station. Here, the IRU 5 is separate, but connected to, the radio base station 7. The IRU 5 itself can be implemented e.g. as shown in FIG. 1A or FIG. 1B.

Figure 2:
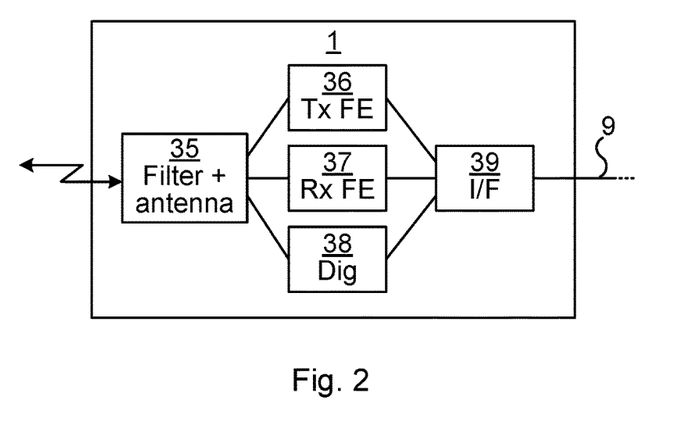
FIG. 2 is a schematic diagram illustrating components of an embodiment of a remote radio head of FIGS. 1A-C.

FIG. 2 is a schematic diagram illustrating components of an embodiment of a remote radio head of FIGS. 1A-C, here represented by a single remote radio head 1. The remote radio head comprises an interface circuitry 39, a transmission front-end 36, a reception front-end 37, a digital unit 38 and an antenna device 35.

Figure 4A:
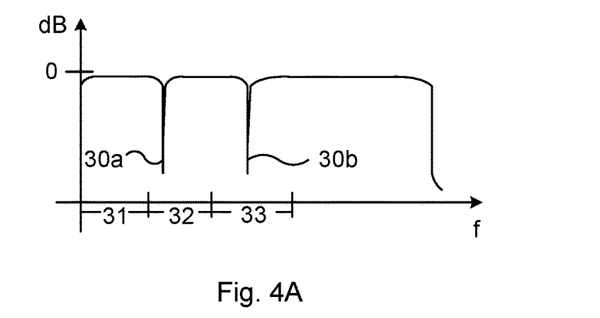
FIGS. 4A-B are schematic graphs illustrating a possible effect of the interference of FIGS. 3A-B.

In line with what is explained above, the RX Front End 37 downconverts received signals in RF to IF for transfer over the cable 9 to the IRU 5. Moreover, the TX Front End 36 upconverts transmission signals from IF, as received over the cable 9 from the IRU 5 to RF for transmission to wireless devices. The antenna device 35 comprises one or more antennas for transmission of RF signals and reception of RF signals. The antenna device 35 may also comprise appropriate filters to filter out unwanted signals. The interface circuitry 39 inserts and extracts (multiplexes and demultiplexes) the transmission IF signal, the received IF signal and the control signal onto the cable 9. The interface circuitry 39 may use different frequency bands for each of the different signals, as seen in FIG. 4A and explained below.

A digital unit 38 communicates with the processor 12 of the IRU. For example, the digital unit 38 may be commanded by the processor 12 to alter frequencies used by the TX Front End 36 and RX Front End 37 for upconversion and/or downconversion. The digital unit 38 can be implemented using software instructions such as a computer program executing by a processor and/or using only hardware, such as application specific integrated circuits, field programmable gate arrays, discrete logical components, etc.

Figure 3A:
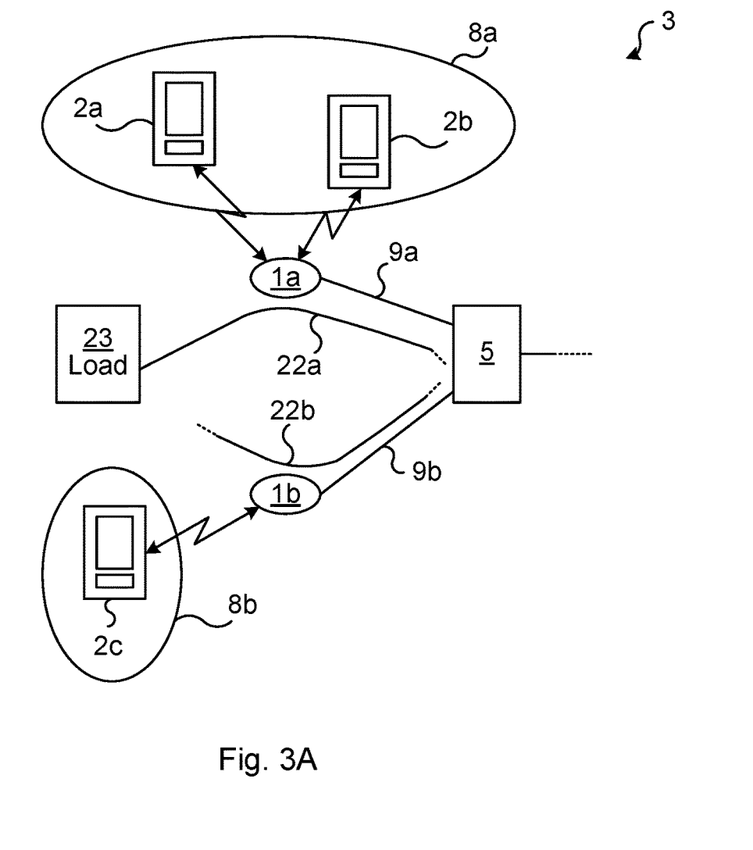
FIGS. 3A-B are schematic diagrams illustrating how interference from external sources can affect embodiments of the systems of FIGS. 1A-C.
Figure 3B:
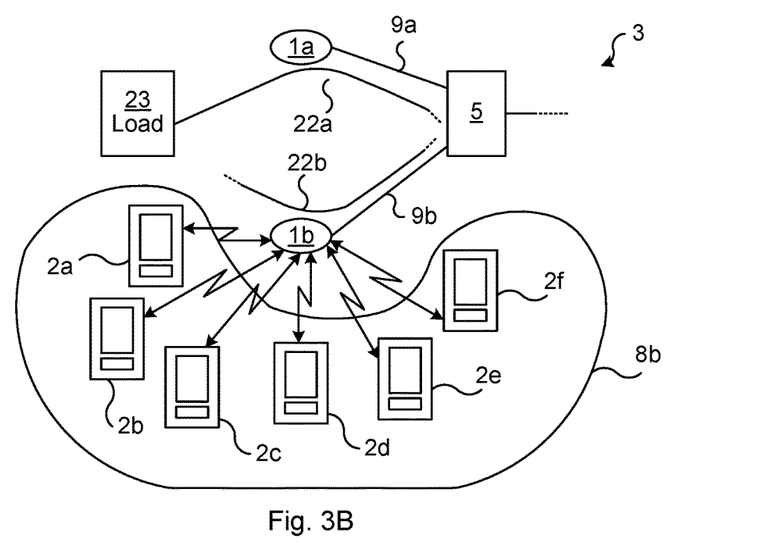

FIGS. 3A-B are schematic diagrams illustrating how interference from external sources can affect embodiments of the systems of FIGS. 1A-C. The example scenario shown in FIG. 3A will be described first. The cables 9a-b between the IRU 5 and the remote radio heads 1a-b are often provided in cable channels which also hold other cables. In this example, there is a first IF cable 9a between the IRU 5 and a first remote radio head 1a. Furthermore, there is a second IF cable 9b between the IRU 5 and a second remote radio head 1b.

In the example shown, there is here a first interfering cable 22a which is in the vicinity of the first IF cable 9a. The two cables 9a, 22a might share a cable channel for a section of their path. The first interfering cable 22a can e.g. be an alternating current (AC) power cable connected to a load 23. There is a particularly large risk of interference when the load 23 is inductive, such as when the load 23 comprises a motor, e.g. to power a fan. Hence, the first IF cable 9a experiences interference, in this case from a first interfering cable 22a. Analogously, the second IF cable 9b experiences interference from a second interfering cable 22b.

The interfering cable 22a can also be another cable carrying IF signals, i.e. with similar properties as the 9a. Interference can be caused if selection of IF signals is uncoordinated, e.g. if 22a is a cable connecting a remote radio head and another IRU than the IRU 5 shown in FIG. 3B, within the scope of the same or another radio base station.

There is a first set 8a of wireless devices in the vicinity of the first remote radio head 1a and a second set 8b of a single wireless device in the vicinity of the second remote radio head 1b. The first set 8a comprises a first wireless device 2a and a second wireless device 2b and the second set 8b comprises a third wireless device 2C.

The interference may cause disruptions in the uplink and/or downlink communication and may lead to retransmissions and lower throughput.

According to embodiment presented herein, the interference on the IF cables can be detected by averaging signal quality estimates of wireless terminals of a set associated with the cable and performing a spectral analysis of the resulting average signal quality. This will suppress transient issues whereby the more persistent interference remains. This is explained in more detail with reference to FIGS. 7A-B below.

FIG. 3B shows the same structure as shown in FIG. 3A, but here the second set of wireless terminals comprises six wireless devices 2a-f, which are then all in the vicinity of the second remote radio head 1b. Since there are so many wireless devices 2a-f in the vicinity of the second remote radio head 1b, and the second remote radio head 1b is connected to the IRU 5 via the second IF cable 9b, there is a large amount of traffic over the second IF cable 9b. Because of the large amount of traffic, the averaging of signal quality only needs to occur for a small amount of time.

Figure 4B:
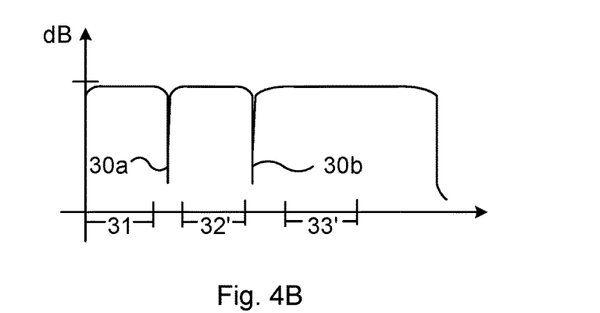

FIGS. 4A-B are schematic graphs illustrating a possible effect of the interference of FIGS. 3A-B. A signal quality is plotted against the vertical axis represents signal loss and the horizontal axis represents frequency. The graphs illustrate use of the frequency spectrum and interference in IF, e.g. on the IF cables of FIGS. 3A-B. Looking first to FIG. 4A, there are here three frequency sections 31-33. A first frequency section 31 is used for control signals (e.g. between the processor 12 of the IRU 5 and the digital unit 38 of the remote radio heads 1). A second frequency section 32 is used for received signals, which have been downconverted from RF by the interface circuitry of the remote radio head 1. A third frequency section 33 is used for transmission signals, which have been upconverted from BB by the interface circuitry of the IRU 5. It is to be noted that the various frequency sections 31-33 are only schematic and not to scale.

There is a first interference dip 30a and a second interference dip 30b. The interference dips 30a-b indicate low signal quality, e.g. low SINR (Signal to Interference and Noise Ratio). Significantly, the first interference dip 30a has a frequency within the second frequency section 32 and the second interference dip has a frequency within the third frequency section 33. Hence, the interference causes issues for both received signals and transmission signals.

According to embodiments presented herein, such interference dips can be detected by spectral analysis of the signal quality. Once the interference dips are detected, appropriate action can be taken to reduce or even eliminate the effects of the interference, e.g. by moving one or more frequency sections in the frequency spectrum. Looking now to FIG. 4B, the second frequency section 32 has now moved in frequency to a new second frequency section 32' in order to avoid overlapping with the first interference dip 30a. Analogously, the third frequency section 33 has mobbed to a new third frequency section 33' in order to avoid overlapping with the second interference dip 30b.

Hence, by correctly identifying the frequency location of the interference, the effects of the interference are essentially eliminated by using new parts of the available spectrum.

It is to be noted that there are upper limits to what frequencies can be used, indicated by the dip of the signal quality at the far right of FIGS. 4A-B. The upper limit depends on the type of cable used. For example, the upper limit of a CAT6 cable is much higher than that of a CAT5 cable.

Figure 5:
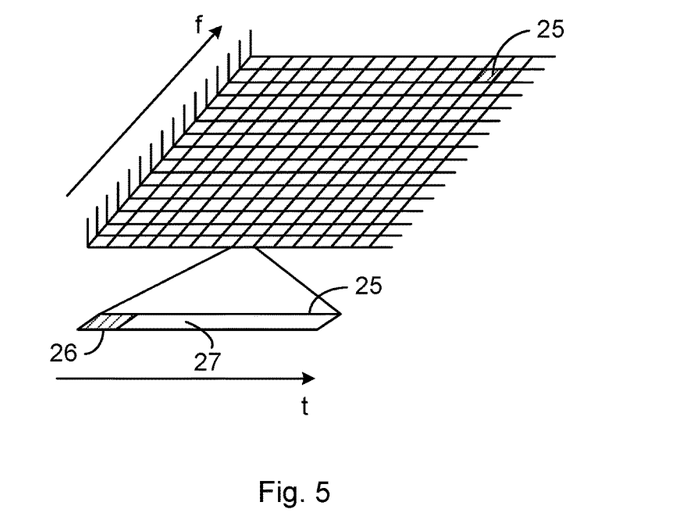
FIG. 5 is a schematic diagram illustrating the physical resources for LTE downlink.

Looking now to FIGS. 5 and 6, the frequency and time slot utilisation of LTE will be described in some more detail. FIG. 5 is a schematic diagram illustrating the physical resources for downlink communication in LTE (Long Term Evolution). Downlink communication is communication from a network node to a wireless device. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 5, where each resource element 25 corresponds to one OFDM subcarrier during one OFDM symbol interval. Each resource element 25 comprises cyclic prefix section 26 and a main section 27.

Figure 6:
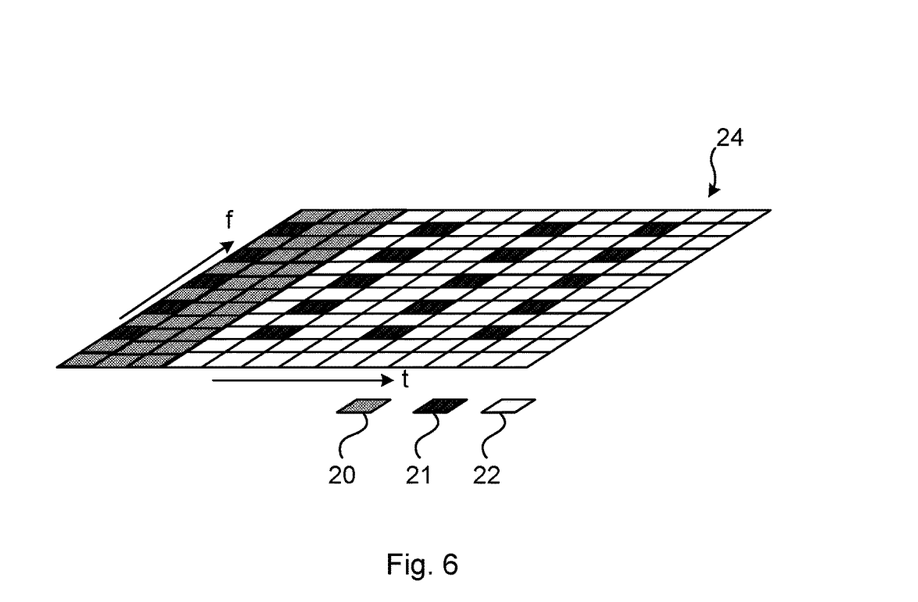
FIG. 6 is a schematic diagram illustrating a downlink resource block.

FIG. 6 is a schematic diagram illustrating a downlink resource block 24. The resource allocation in LTE is typically described in terms of resource blocks (RB), where a resource block can correspond to one slot (0.5 ms) in the time domain and twelve subcarriers in the frequency domain. A pair of two adjacent resource blocks in the time direction (1.0 ms) is known as a resource block pair. Each resource block comprises a number of resource elements, where each resource element occupies one subcarrier in the frequency domain and one OFDM symbol in the time domain. The number of OFDM symbols in a resource block can vary and can e.g. be six or seven OFDM symbols.

Downlink transmissions are dynamically scheduled, i.e. in each subframe the radio base station transmits control information about to which wireless devices data is transmitted and upon which resource blocks the data is transmitted, in the current downlink subframe. This control signaling is typically transmitted in a control region 20 in the first one, two or three OFDM symbols in each subframe and the number n=1, 2 or 3 is known as the Control Format Indicator (CFI), thus indicating the number of OFDM symbols being part of the control region 20. The downlink subframe also contains cell specific reference signals (CRS) 21, which are known to the receiver and used for interference estimation and coherent demodulation of, e.g., the control information and payload data. The CRS 21 can be used to obtain signal quality which can be used to determine the presence of any cable interference as described below. The remaining resource elements are available for payload data 22, also comprising interspersed CRS elements 21. A downlink system with CFI=3 OFDM symbols as control for a resource block 29 is illustrated in FIG. 4.

Figure 7A:
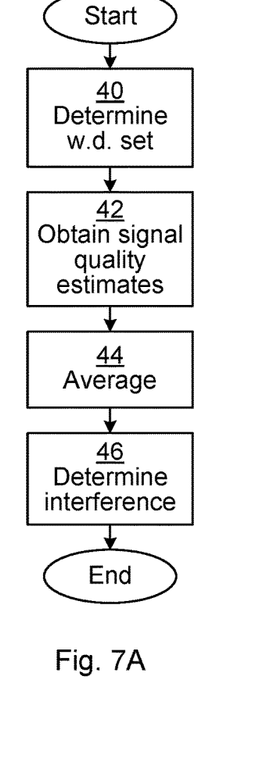
FIGS. 7A-B are flow charts illustrating methods performed in a network node of FIG. 1 for assisting downlink interference estimation.
Figure 7B:
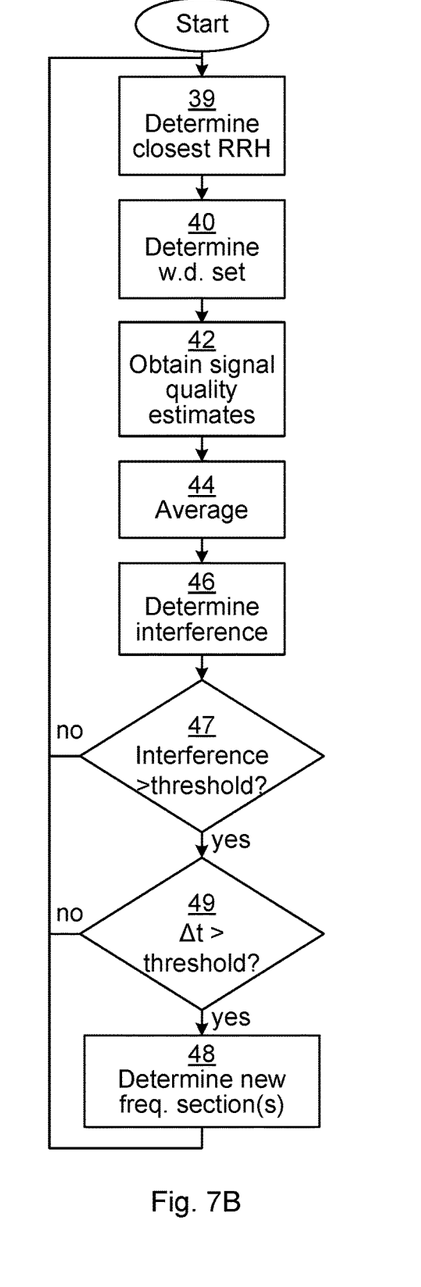

FIGS. 7A-B are flow charts illustrating methods performed in a network node of FIGS. 1A-C for evaluating interference affecting a cable between a network node and at least one remote radio head. The network node can be the radio base station 7 or the IRU 5 of FIGS. 1A-C.

In a determine w.d. (wireless device) set step 40, a set 8a-b of wireless devices to be associated with the cable is determined. The set of wireless devices are then associated with the cable in question. This can e.g. be due to traffic to and/or from the wireless devices in question pass via the cable.

In an obtain signal quality estimates step 42, a plurality of signal quality estimates associated with each one of the wireless devices of the set 8a-b of wireless devices are obtained.

In one embodiment, this step comprises measuring uplink reference signals from each one of the wireless devices of the set of wireless devices. Such uplink reference signals can e.g. be sounding reference signals. When the uplink reference signals are used, the signal quality can be measured with arbitrary frequency accuracy, since the content of the reference signal is used per se and this is compared to the received signal containing the reference signal In one embodiment, this step comprises receiving measurement reports from each one of the wireless devices of the set of wireless devices. The measurements reports are based on how downlink reference signals, such as the CRS signals (21 of FIG. 6) are received at the respective wireless device. Existing reports may be used for evaluation of downlink signal quality, e.g. based on CRS. However, such evaluation is then limited, in the granulation of frequency, to the frequency granulation of the downlink reference signals and how the signal quality on these are reported.

In one embodiment, this step comprises obtaining a number of retransmissions for each one of the wireless devices of the set of wireless devices.

In an average step 44, the signal quality estimates for the set of wireless devices are averaged, yielding an average signal quality. Optionally, the averaging also comprises averaging the signal quality estimates over a time period. The time period can e.g. depend on the number of wireless devices in the set of wireless devices. For example, if there are many wireless devices in the set, thus associated with the cable, (e.g. as shown in FIG. 3B) then a shorter time is needed than if there are few or only one wireless device in the set.

In a determine interference step 46, interference affecting the cable is determined based on a spectral analysis of the average signal quality. This step comprises finding dips in the signal quality, e.g. as shown in FIG. 4A and explained above.

When the obtain signal quality estimates step 42 comprises obtaining a number of retransmissions, this step comprises determining for what frequency band or frequency bands retransmissions are most common. This can e.g. be determined by checking on what frequencies (see FIGS. 5 and 6) scheduled data is retransmitted. The frequency for retransmissions can be determined by comparing a stored schedule for transmissions for the wireless device with the retransmission indicator, e.g. a NACK for HARQ (Hybrid Automatic Repeat Request).

FIG. 7B is a flow chart illustrating a method similar to the method illustrated in FIG. 7A. Only new steps or steps which are modified compared to the method illustrated in FIG. 7A will be described below.

In a determine closest RRH (Remote Radio Head) step 39, it is determined, for each one of a plurality of wireless devices, which one of the at least one remote radio head is closest. Since each remote radio head is connected to the IRU via a cable, the closest remote radio head indicates also which cable is used to transmit data to or from a particular wireless device. In such a case, the determine w.d. set step 40 comprises determining the set of wireless devices to only include those wireless devices which are closest to one or more remote radio heads which are connected to the cable.

In an optional conditional interference > threshold step 47, it is determined whether the interference is greater than a threshold value. If this is true, the method continues to a $\Delta t$ > threshold step 49. Otherwise, the method returns to the beginning. In this way, no action is taken for only small amounts of interference.

In the optional conditional $\Delta t$ > threshold step 49, it is determined whether a threshold time has passed since the last determination of new frequency sections. If this is true, the method continues to a determine new frequency section(s) step 48. Otherwise, the method returns to the beginning. In this way, actions need not to be taken if there is only a temporary degradation due to interference.

In an optional determine new frequency section(s) step 48, one or more new frequency sections to use on the cable are determined based on the interference affecting the cable. This corresponds to moving the frequency sections from the frequency sections used in FIG. 4A to the frequency sections used in FIG. 4B.

Figure 8:
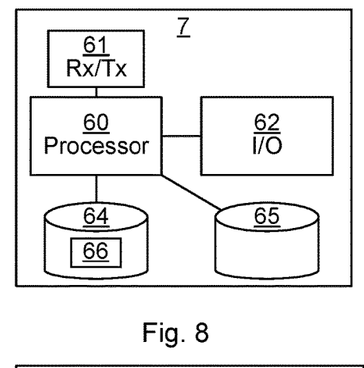
FIG. 8 is a schematic diagram showing some components of an embodiment of the radio base station of FIGS. 1A-C.

FIG. 8 is a schematic diagram showing some components of the radio base station 7 of FIGS. 1A-C. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 6o can be configured to execute the methods described with reference to FIGS. 7A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory.

The radio base station 7 further comprises an I/O interface 62 for communicating with a core network and optionally with other radio base stations.

The radio base station 7 also comprises one or more transceivers 61, comprising analogue and digital components for radio communication with wireless devices within one or more radio cells, e.g. using remote radio heads as described above. The processor 60 controls the general operation of the radio base station 7, e.g. by sending control signals to the transceiver 61 and receiving reports from the transceiver 61 of its operation.

Other components of the radio base station 7 are omitted in order not to obscure the concepts presented herein.

Figure 9:
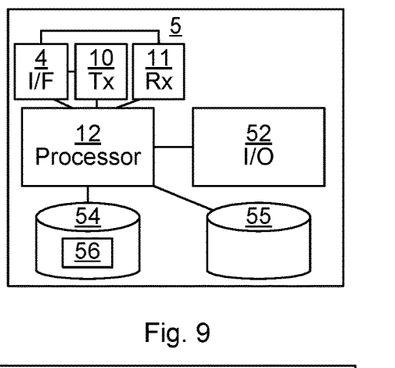
FIG. 9 is a schematic diagram showing some components of an embodiment of the intermediate radio unit of FIGS. 1A-C.

FIG. 9 is a schematic diagram showing some components of any one of the intermediate radio units 5 of FIGS. 1A-C, here represented by a single intermediate radio unit 5. A processor 12 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 12 can be configured to execute the methods described with reference to FIGS. 7A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 55 can be any combination of read and write memory (RAM) and read only memory (ROM). The data memory 55 may also comprise persistent storage, which, for example, can be any single one or combination of magnetic memory, optical memory, solid state memory or even remotely mounted memory.

The intermediate radio unit 5 further comprises an interface circuitry 4, a transmitter back-end 10 and receiver back-end 11 which operate as described with reference to FIGS. 1A-C above.

The intermediate radio unit 5 may separate from and connected to a radio base station, or form part of a hosting radio base station. When the intermediate radio unit 5 forms part of a hosting radio base station, some or all of the components of FIG. 9 may also be used for other purposes within the radio base station and may e.g. be the equivalent components shown in FIG. 8.

Other components of the intermediate radio unit 5 are omitted in order not to obscure the concepts presented herein.

Figure 10:
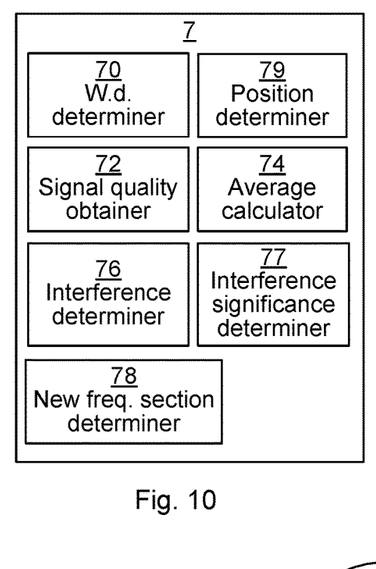
FIG. 10 is a schematic diagram showing functional modules of an embodiment of the radio base station of FIGS. 1A-C.

FIG. 10 is a schematic diagram showing functional modules of an embodiment of the radio base station of FIGS. 1A-C. The modules can be implemented using software instructions such as a computer program executing in the radio base station 7 and/or using hardware, such as application specific integrated circuits, field programmable gate arrays, discrete logical components, etc. The modules correspond to the steps in the methods illustrated in FIGS. 7A-B.

A wireless device determiner 70 is arranged to determining a set of wireless devices to be associated with the cable. This module corresponds to the determine w.d. set step 40 of FIGS. 7A-B.

An optional position determiner 79 is arranged to determine, for each one of a plurality of wireless devices, which one of the at least one remote radio head which is closest. This module corresponds to the determine closest RRH step 39 of FIG. 7B.

A signal quality obtainer 72 is arranged to obtain a plurality of signal quality estimates associated with each one of the wireless devices of the set of wireless devices. This module corresponds to the obtain signal quality estimates step 42 of FIGS. 7A-B.

An average calculator 74 is arranged to average the signal quality estimates for the set of wireless devices, yielding an average signal quality. This module corresponds to the average step 44 of FIGS. 7A-B.

An interference determiner 76 is arranged to determine interference affecting the cable based on a spectral analysis of the average signal quality. This module corresponds to the determine interference step 46 of FIGS. 7A-B.

An optional interference significance determiner 77 is arranged to determine whether a cable interference is significant, e.g. due to amount of interference or duration of interference. This module corresponds to the conditional interference > threshold step 47 and the conditional Δt > threshold step 49 of FIG. 7B.

An optional new frequency section determiner 78 is arranged to determine one or more new frequency sections to use on the cable based on the interference affecting the cable. This module corresponds to the determine new frequency section(s) step 48 of FIG. 7B.

Figure 11:
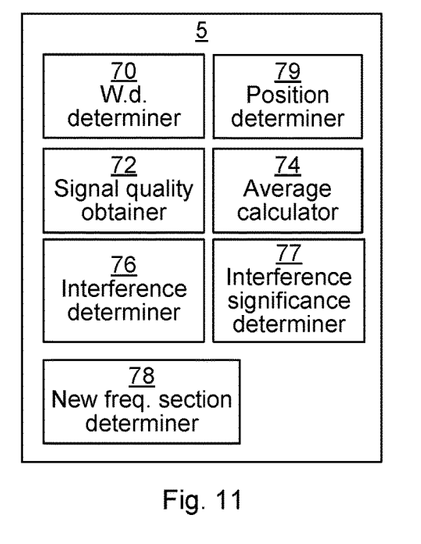
FIG. 11 is a schematic diagram showing functional modules of an embodiment of the intermediate radio unit of FIGS. 1A-C.

FIG. 11 is a schematic diagram showing functional modules of an embodiment of the intermediate radio unit 5 of FIGS. 1A-C. The modules can be implemented using software instructions such as a computer program executing in the intermediate radio unit 5 and/or using hardware, such as application specific integrated circuits, field programmable gate arrays, discrete logical components, etc. The modules correspond to the steps in the methods illustrated in FIGS. 7A-B. The intermediate radio unit 5 comprises the same modules as described above with reference to the radio base station 7 of FIG. 10.

Figure 12:
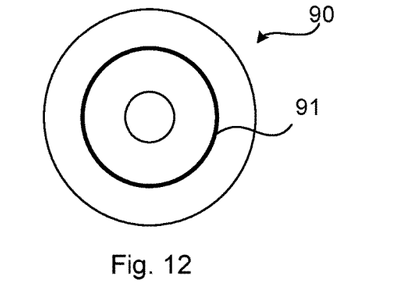
FIG. 12 shows one example of a computer program product 90 comprising computer readable means.

FIG. 12 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 8 or the computer program product 56 of FIG. 9. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for evaluating interference affecting a cable between a network node and at least one remote radio head, the method being performed in the network node and comprising the steps of:
   determining a set of wireless devices to be associated with the cable;
   obtaining a plurality of signal quality estimates associated with each one of the wireless devices of the set of wireless devices;
   averaging the signal quality estimates for the set of wireless devices, yielding an average signal quality; and
   determining interference affecting the cable based on a spectral analysis of the average signal quality.

2. The method according to claim 1, wherein the step of averaging also comprises averaging the signal quality estimates over a time period.

3. The method according to claim 2, wherein the time period depends on the number of wireless devices in the set of wireless devices.

4. The method according to claim 1, wherein the step of obtaining a plurality of signal quality estimates comprises measuring uplink reference signals from each one of the wireless devices of the set of wireless devices.

5. The method according to claim 1, wherein the step of obtaining a plurality of signal quality estimates comprises receiving measurement reports from each one of the wireless devices of the set of wireless devices, wherein the measurements reports are based on how downlink reference signals are received at the respective wireless device.

6. The method according to claim 1, wherein the step of obtaining a plurality of signal quality estimates comprises obtaining a number of retransmissions for each one of the wireless devices of the set of wireless devices; and wherein the step of determining interference comprises determining for what frequency band or frequency bands retransmissions are most common.

7. The method according to claim 1, further comprising the step, prior to the step of determining, of:
   determining, for each one of a plurality of wireless devices, which one of the at least one remote radio head which is closest;
   and wherein the step of determining a set of wireless devices to be associated with the cable comprises determining the set of wireless devices to only include those wireless devices which are closest to one or more remote radio heads which are connected to the cable.

8. The method according to claim 1, further comprising the step of:
   determining one or more new frequency sections to use on the cable based on the interference affecting the cable, when the interference is greater than a threshold value.

9. The method according to claim 8, wherein the step of determining one or more new frequency sections to use only determines one or more new frequency sections to use when a threshold time has passed since the last determination of new frequency sections.

10. A network node for evaluating interference affecting a cable between a network node and at least one remote radio head, the network node comprising:
   a processor; and
   a memory storing instructions that, when executed by the processor, causes the network node to:
   determine a set of wireless devices to be associated with the cable;
   obtain a plurality of signal quality estimates associated with each one of the wireless devices of the set of wireless devices;
   average the signal quality estimates for the set of wireless devices, yielding an average signal quality; and
   determine interference affecting the cable based on a spectral analysis of the average signal quality.

11. The network node according to claim 10, wherein the instructions to average also comprise instructions that, when executed by the processor, causes the network node to average the signal quality estimates over a time period.

12. The network node according to claim 11, wherein the time period depends on the number of wireless devices in the set of wireless devices.

13. The network node according to claim 10, wherein the instructions to obtain a plurality of signal quality estimates comprise instructions that, when executed by the processor, causes the network node to measure uplink reference signals from each one of the wireless devices of the set of wireless devices.

14. The network node according to claim 10, wherein the instructions to obtain a plurality of signal quality estimates comprise instructions that, when executed by the processor, causes the network node to receive measurement reports from each one of the wireless devices of the set of wireless devices, wherein the measurements reports are based on how downlink reference signals are received at the respective wireless device.

15. The network node according to claim 10, wherein the instructions to obtain a plurality of signal quality estimates comprise instructions that, when executed by the processor, causes the network node to obtain a number of retransmissions for each one of the wireless devices of the set of wireless devices; and wherein the instructions to determine interference comprise instructions that, when executed by the processor, causes the network node to determine for what frequency band or frequency bands retransmissions are most common.

16. The network node according to claim 10, further comprising instructions that, when executed by the processor, causes the network node to:
   determine, for each one of a plurality of wireless devices, which one of the at least one remote radio head which is closest;
   and wherein the instructions to determine a set of wireless devices to be associated with the cable comprise instructions that, when executed by the processor, causes the network node to determine the set of wireless devices to only include those wireless devices which are closest to one or more remote radio heads which are connected to the cable.

17. The network node according to claim 10, further comprising instructions that, when executed by the processor, causes the network node to:
   determine one or more new frequency sections to use on the cable based on the interference affecting the cable, when the interference is greater than a threshold value.

18. The network node according to claim 17, wherein the instructions to determine one or more new frequency sections to use only determines one or more new frequency sections to use when a threshold time has passed since the last determination of new frequency sections.

19. A non-transitory computer readable medium for evaluating interference affecting a cable between a network node and at least one remote radio head, comprising computer program code which, when run on a network node causes the network node to:
   determine a set of wireless devices to be associated with the cable;
   obtain a plurality of signal quality estimates associated with each one of the wireless devices of the set of wireless devices;
   average the signal quality estimates for the set of wireless devices, yielding an average signal quality; and
   determine interference affecting the cable based on a spectral analysis of the average signal quality.

* * * * *